(12) United States Patent
Neugebauer et al.

(10) Patent No.: US 8,954,273 B2
(45) Date of Patent: Feb. 10, 2015

(54) NAVIGATION SYSTEM, PARTICULARLY FOR A MOTOR VEHICLE

(75) Inventors: Moritz Neugebauer, Berlin (DE); Gordon Seitz, Ehra-Lessien (DE); Stefan Schulz, Berlin (DE); Imke Gaus, Berlin (DE); Oliver Meyer, Ingolstadt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/531,716

(22) Filed: Jun. 25, 2012

(65) Prior Publication Data
US 2012/0303275 A1  Nov. 29, 2012

Related U.S. Application Data

(63) Continuation of application No. PCT/EP2010/007405, filed on Dec. 7, 2010.

(30) Foreign Application Priority Data

Dec. 24, 2009 (DE) .......................... 10 2009 060 365

(51) Int. Cl.
*G01C 21/36* (2006.01)

(52) U.S. Cl.
CPC ........ *G01C 21/3614* (2013.01); *G01C 21/3611* (2013.01)
USPC ........... 701/533; 715/781; 715/848; 715/850; 715/852

(58) Field of Classification Search
CPC ........... G01C 21/3611; G01C 21/3617; G01C 21/32; G01C 21/3667; G08G 1/096861; G10L 15/08
USPC ............ 701/426, 431, 532, 533, 538, 3, 452; 704/270, 251; 455/456.1; 340/995.14; 715/841, 781, 848
See application file for complete search history.

(56) References Cited

U.S. PATENT DOCUMENTS

| | | | | |
|---|---|---|---|---|
| 5,072,395 A | * | 12/1991 | Bliss et al. | 701/538 |
| 6,108,631 A | * | 8/2000 | Ruhl | 704/270 |
| 6,470,267 B1 | * | 10/2002 | Nozaki | 701/533 |
| 7,236,924 B2 | | 6/2007 | Ehrke | |
| 7,328,155 B2 | * | 2/2008 | Endo et al. | 704/251 |
| 7,472,020 B2 | | 12/2008 | Bruelle-Drews | |
| 7,536,189 B2 | * | 5/2009 | Himmelstein | 455/456.1 |
| 7,720,596 B2 | * | 5/2010 | Kobuya et al. | 701/426 |
| 7,743,337 B1 | * | 6/2010 | Maeda et al. | 715/781 |
| 7,809,501 B2 | | 10/2010 | Listle et al. | |

(Continued)

FOREIGN PATENT DOCUMENTS

| | | |
|---|---|---|
| CN | 101354263 A | 1/2009 |
| DE | 199 29 425 A1 | 12/2000 |

(Continued)

*Primary Examiner* — Tuan C. To
*Assistant Examiner* — Yuri Kan
(74) *Attorney, Agent, or Firm* — Muncy, Geissler, Olds & Lowe, P.C.

(57) ABSTRACT

A navigation system, in particular for a motor vehicle, for determining a route to a destination, wherein the navigation system includes an input device for alphanumeric input of the destination and a display for displaying changing information and includes a processing unit for displaying potential destinations in a representation of a map by means of the display during input of the destination.

14 Claims, 4 Drawing Sheets

(56) References Cited

U.S. PATENT DOCUMENTS

| | | |
|---|---|---|
| 2004/0085227 A1* | 5/2004 | Mikuriya et al. ........ 340/995.14 |
| 2004/0098195 A1* | 5/2004 | Listle et al. .................. 701/211 |
| 2004/0128064 A1 | 7/2004 | Lueer et al. |
| 2005/0086612 A1* | 4/2005 | Gettman et al. ............. 715/848 |
| 2005/0137758 A1* | 6/2005 | He et al. .......................... 701/3 |
| 2006/0058943 A1* | 3/2006 | Pascual et al. ............... 701/200 |
| 2006/0122771 A1* | 6/2006 | Mikuriya et al. ............ 701/210 |
| 2006/0229802 A1* | 10/2006 | Vertelney et al. ............ 701/200 |
| 2007/0073477 A1 | 3/2007 | Krumm et al. |
| 2007/0106464 A1* | 5/2007 | Yamada ........................ 701/208 |
| 2008/0040030 A1* | 2/2008 | Oohashi ........................ 701/208 |
| 2008/0167809 A1* | 7/2008 | Geelen .......................... 701/209 |
| 2008/0312817 A1 | 12/2008 | Kawauchi |
| 2009/0018766 A1* | 1/2009 | Chen et al. .................... 701/202 |
| 2009/0105934 A1 | 4/2009 | Tajima et al. |
| 2009/0171579 A1* | 7/2009 | Wu et al. ...................... 701/211 |
| 2009/0172599 A1* | 7/2009 | Nezu ............................. 715/841 |
| 2009/0198442 A1* | 8/2009 | Takagi .......................... 701/201 |
| 2010/0023252 A1* | 1/2010 | Mays et al. ................... 701/201 |
| 2010/0057344 A1* | 3/2010 | Nezu et al. ................... 701/201 |
| 2012/0303275 A1* | 11/2012 | Neugebauer et al. ......... 701/533 |

FOREIGN PATENT DOCUMENTS

| | | |
|---|---|---|
| DE | 100 25 042 A1 | 1/2002 |
| DE | 103 13 222 A1 | 12/2003 |
| DE | 103 61 479 A1 | 7/2005 |
| DE | 10 2004 010406 B3 | 10/2005 |
| DE | 10 2005 058145 A1 | 6/2007 |
| EP | 1 624 288 A1 | 2/2006 |
| EP | 2 075 547 A2 | 7/2009 |
| EP | 2 241 983 A1 | 10/2010 |
| KR | 10-2004-0038883 | 5/2004 |
| KR | 10-2007-0008615 | 1/2007 |

* cited by examiner

NAVIGATION SYSTEM, PARTICULARLY FOR A MOTOR VEHICLE

This nonprovisional application is a continuation of International Application No. PCT/EP2010/007405, which was filed on Dec. 7, 2010, and which claims priority to German Patent Application No. DE 10 2009 060 365.4, which was filed in Germany on Dec. 24, 2009, and which are both herein incorporated by reference.

BACKGROUND OF THE INVENTION

1. Field of the Invention

The invention relates to a navigation system, particularly for a motor vehicle, for determining a route to a destination, whereby the navigation system comprises an input device for the input of the destination and a display for displaying changing information. The invention relates in addition to a method for operating such a navigation system.

2. Description of the Background Art

DE 103 61 479 A1 discloses a device for inputting alphanumeric characters with a display unit on which main and special characters can be displayed, whereby by means of an input means a displayed alphanumeric character can be selected for inputting into an infotainment system, whereby the special characters are divided into at least two groups, and whereby the grouped special characters are each assigned to a main character. This allows for the main and special characters to be input, whereby the display device has an input display field in which the selected alphanumeric characters are displayed.

DE 103 13 222 A1, which corresponds to U.S. Pat. No. 7,809,501, discloses a method for the input of place names into a navigation system in a vehicle, whereby a place name is input, whereby an entered place name is compared with place names stored in a memory, and whereby in case that the entered place name is assigned to at least two different places, at least one map is shown to identify the places.

EP 1 624 288 A1, which corresponds to U.S. Pat. No. 7,472,020, discloses a navigation system for a vehicle, the system outputs route planning and route guidance information, whereby a voice control system is provided by means of which the output of secondary information can be initiated.

SUMMARY OF THE INVENTION

It is an object of the invention in an embodiment, to accelerate the input of destinations in navigation systems, particularly in navigation systems for motor vehicles, whereby particularly incorrect inputs are to be reduced or prevented. It is the object of the invention, in particular, to develop further a device according to DE 103 61 479 A1, which is incorporated herein by reference and assigned to the same Applicant hereof, so that the input of destinations can be accelerated.

The aforementioned object is attained in an embodiment by a navigation system, particularly for a motor vehicle, for determining a route to a destination, whereby the navigation system comprises an input device for the alphanumeric input of the destination and a display for displaying changing information, and whereby the navigation system has a processing unit for displaying possible destinations in a map display by means of the display during the input of the destination.

A map display can be, for example, a map, a satellite image, 3D graphic, etc. The map, satellite image, or 3D graphic, may be shown as a plan view, as a bird's eye view, or a first-person view. A map display within the meaning of the invention comprises in particular an infrastructure intended for the vehicle, for instance, streets.

A route can proceed from the standpoint of the navigation system or a motor vehicle with such a navigation system. A route, however, can also proceed from an entered starting point. In this regard, the input of a starting point can occur in a suitable manner, like the described or claimed input of a destination place.

A display can be a matrix display. A display within the meaning of the invention can be, for example, a TFT.

During the input of a destination can mean before the completion of the input of the destination. During the input of a destination can mean before the input of the last letter of a destination. During the input of a destination can mean an input of 1 to n−1 letters of a destination name or partial name comprising n letters.

An input device for entering alphanumeric characters or for the alphanumeric input of a destination or starting point can be, for example, a rotary knob, a push button, a combination rotary knob/push button, a touch screen arranged over a display, or a voice control system, etc. An alphanumeric input can be a letter-based or a letter- and/or number-based input. Letters can also comprise numbers and/or special characters.

In an embodiment of the invention, during the input of the destination, a selection of possible destinations is displayable in a map display. In a further embodiment of the invention, during the input of an additional letter, a changed selection of possible destinations is displayable in the map display and/or in a changed map display. In a further embodiment of the invention, the navigation system comprises a control element for selecting a destination in the map display. A control element can be, for example, a rotary knob, a push button, a combination rotary knob/push button, or a touch screen arranged over a display, etc. A control element can also be the aforementioned input device.

The aforementioned object is attained, moreover, by a motor vehicle with a navigation system or a navigation module for determining a route to a destination, whereby the motor vehicle comprises an input device for the alphanumeric input of the destination and a display for displaying changing information, and whereby the motor vehicle has a processing unit for displaying possible destinations in a map display by means of the display during the input of the destination.

In an embodiment of the invention, during the input of the destination, a selection of possible destinations is displayable in a map display. In a further embodiment of the invention, during the input of an additional letter, a changed selection of possible destinations is displayable in the map display and/or in a changed map display. In a further embodiment of the invention, the motor vehicle has a control element for selecting a destination in the map display.

The aforementioned object is attained, particularly in conjunction with the aforementioned features, also by a method for operating a navigation system for determining a route to a destination or for operating a motor vehicle with such a navigation system, whereby the navigation system has an input device for the alphanumeric input of the destination, and whereby during the input of the destination, particularly by means of a display, possible destinations are displayed in a map display.

In an embodiment of the invention, during the input of the destination, a selection of possible destinations is displayed in a map display. In a further advantageous embodiment of the invention, the selection comprises no more than 10 destinations. The selection of the destinations can occur, for example, alphabetically in that, for example, the alphabetically first destinations are included in the selection. The selection, however, in an embodiment of the invention comprises the most likely destinations. This type of likelihood estimation can include, for example, the nearness to the starting point, or the location of the navigation system or of a respective motor vehicle with such a navigation system, and/or the size of the destination point. Thus, for example, a likelihood indicator can be the size or population of a destination point divided by the distance from the location of the navigation system or the location of a motor vehicle with such a navigation system.

In a further embodiment of the invention, a changed selection of possible destinations is displayed in the map display or in a changed map display, when an additional letter is input. In a further embodiment of the invention, a narrower selection of the selection of possible destinations is shown highlighted in the map display. Such highlighting can occur, for example, by displaying the name of the respective destination point. Such highlighting, however, can also occur in that the name of the corresponding destination point is highlighted in color, is enlarged, and/or animated (for example, by flashing). In a further embodiment of the invention, the narrower selection comprises the most likely destinations.

In a further embodiment of the invention, the most likely destination is shown especially highlighted in the map display. Such a special highlighting can occur, for example, by displaying the name of the respective destination point. Such a special highlighting, can also occur in that the name of the corresponding destination point is highlighted in color, is enlarged, and/or animated (for example, by flashing). It can also be provided, for example, that an emphasis occurs by the display of the name of the destination point, whereas the special emphasis of the most likely destination occurs by enlarged and/or color-contrasted and/or framed display of the name of the destination point. In a further embodiment of the invention, a destination from the selection of destinations shown in the map is selected acoustically. It can also be provided, however, that a destination of the selection of destinations shown in the map display is selected by means of the aforementioned input device, by means of the aforementioned control element, and/or another control device.

In an embodiment, a method for operating a navigation system for determining a route to a destination or for operating a motor vehicle with such a navigation system is provided, whereby the navigation system has an input device for the especially alphanumeric input of the destination, whereby during and/or after (completion of) the input of the destination, particularly by means of a display, possible destinations are displayed in a map display, and whereby a displayed destination is selected acoustically.

In an embodiment of the invention, a request for a repeated selection is output, when the acoustic input could not be assigned to a destination.

A motor vehicle within the meaning of the invention is particularly a land vehicle to be used individually in road traffic. Motor vehicles within the meaning of the invention are particularly not limited to land vehicles with an internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
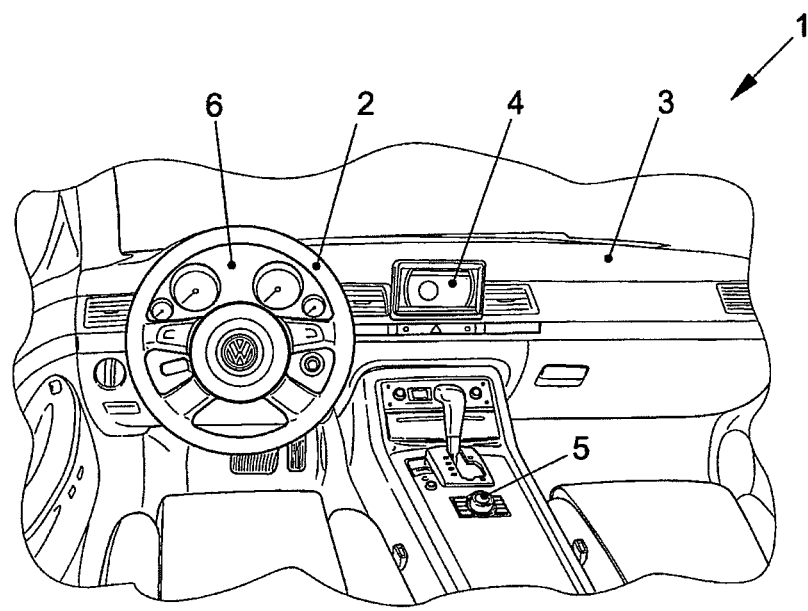
FIG. 1 shows an exemplary embodiment of a motor vehicle in a partial interior view.
Figure 2:
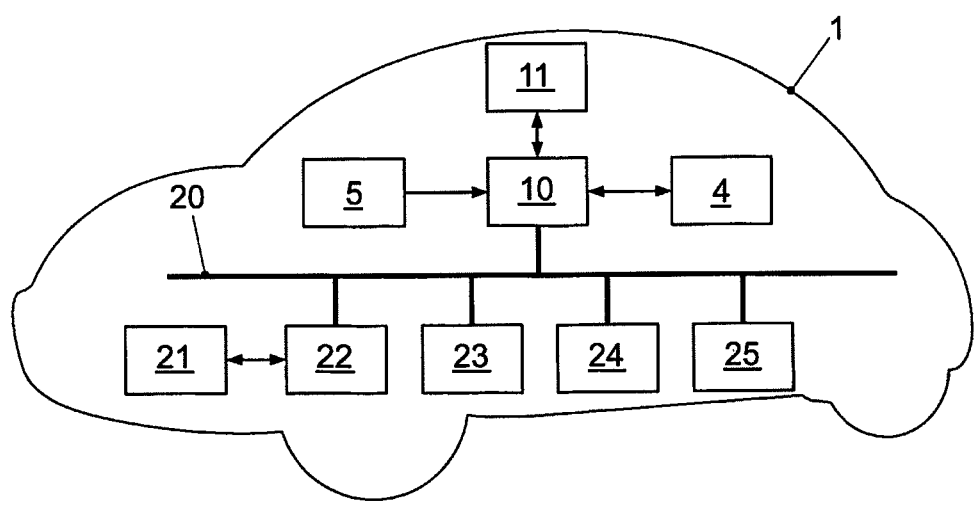
FIG. 2 shows the motor vehicle according to FIG. 1 in an exemplary functional schematic diagram.

FIG. 1 shows an exemplary embodiment of a motor vehicle 1 in a partial interior view, and in FIG. 2 in a functional schematic diagram. Vehicle 1 comprises a display 4, disposed in the area of dashboard 3 of vehicle 1, for operating vehicle 1. It can be provided for this purpose that a touch screen is arranged over display 4. In addition or alternatively, vehicle 1 can be operated by means of a control element, indicated by reference character 5, in conjunction with display 4. Moreover, vehicle 1 comprises an instrument cluster 6 arranged forward of steering wheel 2. The following statements in regard to display 4 can apply alternatively or in addition also to a display integrated into instrument cluster 6.

To operate vehicle 1 or individual functions of vehicle 1 by means of display 4 or a touch screen arranged over it or control element 5, a display and operating control 10 is provided by means of which a voice input and output system 11 can be controlled or read out. Display and operating control 10 is connected via a bus system 20 to a telephone interface 22 for operating a cellular phone 21, to a navigation module 23, to an automatic climate control system 24, and to an infotainment system 25, which can be operated by means of display and operating control 10 or voice input and output system 11, control element 5, and/or display 4. Navigation module 23 can also be called a navigation system. Navigation module 23 in conjunction with display and operating control 10, display 4, and/or control element 5, and optionally in conjunction with voice input and output system 11, however, form an exemplary embodiment for a navigation system within the meaning of the claims.

Figure 3:
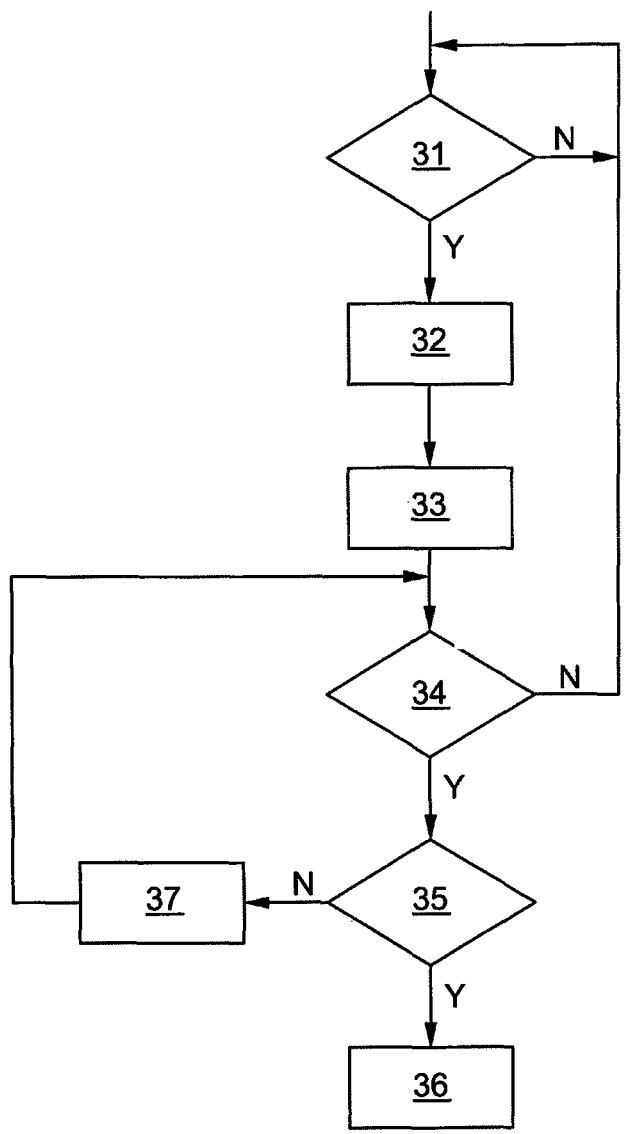
FIG. 3 shows an exemplary embodiment of a method for operating a motor vehicle according to FIG. 1 or a navigation system of a motor vehicle according to FIG. 1.
Figure 4:
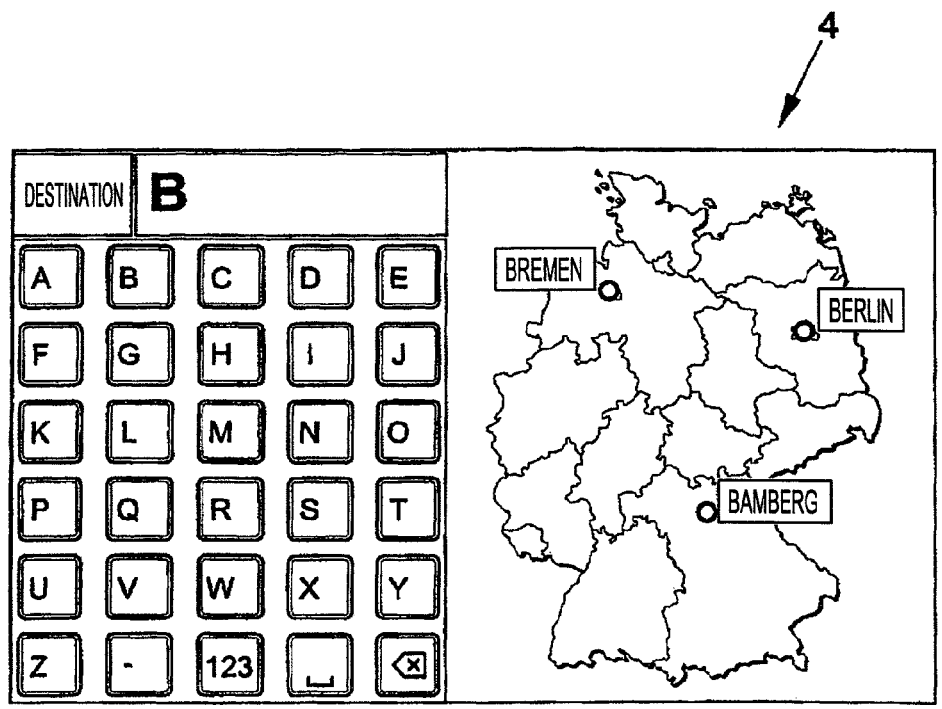
FIG. 4 shows an input mask for the alphanumeric input of place names.
Figure 5:
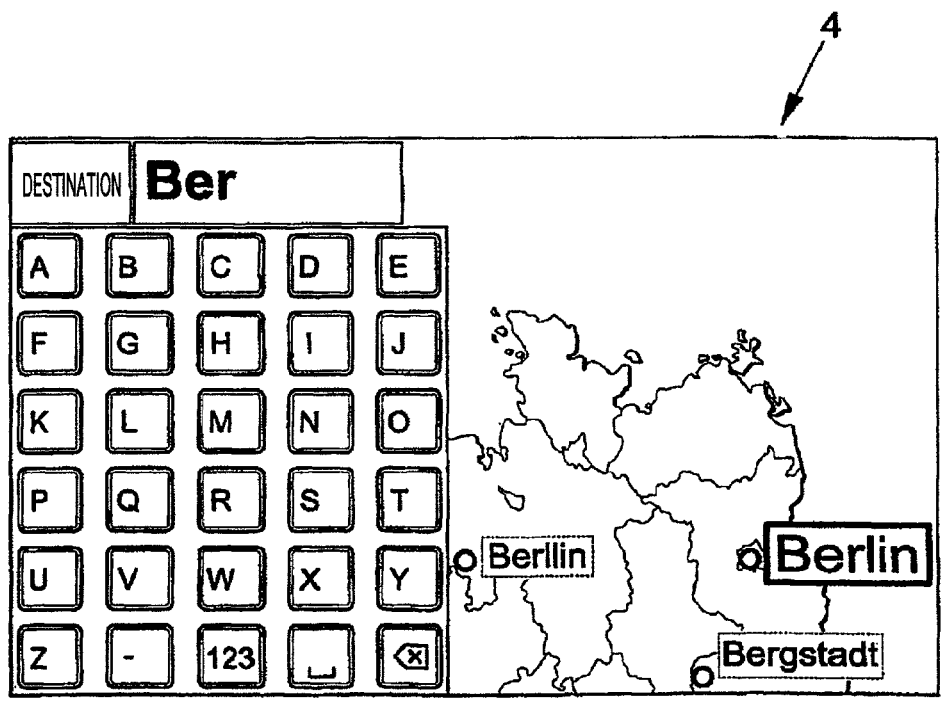
FIG. 5 shows the input mask according to FIG. 4 in another state.

FIG. 3 shows an exemplary embodiment of a method for operating motor vehicle 1 or a navigation system. In this case, a query 31 occurs first, whether an input of an alphanumeric character has occurred. To input an alphanumeric character, for example, as shown in FIG. 4 and FIG. 5, an alphanumeric keyboard is shown by means of display 4, whereby the alphanumeric keyboard can be operated by means of touch screen arranged over display 4 and/or by means of control element 5. If no input has occurred, query 31 is repeated. If, in contrast, an input has occurred, the destinations possible in response to this input are determined in a step 32, and in a step 33, as shown by way of example in FIG. 4, a selection of possible destinations is shown based on the input in an adapted map display. In the exemplary embodiment shown in FIG. 4, based on the input of the letter "B" the cities "Bremen," "Berlin," and "Bamberg" are shown as possible destinations in the map display. It is provided in the employed example that the selection is limited to the three most likely destinations. The selection can also be limited, for example, to the 10 most likely destinations. It is provided moreover that the map display is shown adapted to the selected destinations. The shown destinations ("Bremen," "Berlin," and "Bamberg") can be selected by touching a touch screen arranged over display 4 and/or by means of control element 5. It can be provided in particular, however, that the selection of a destination occurs acoustically by naming its name.

Step 33 is followed by a query 34, whether a destination has been selected according to these examples. If no destination has been selected or no such attempt has been detected, query 34 is again followed by query 31. FIG. 5 shows a state in which the loop comprising query 31, step 32, step 33, and query 34 has already been run through three times and has resulted in the input (and display) "BER." The display and operating control 10 or navigation module 23 has selected the places "Berllin," "Berlin," and "Bergstadt" as the three most likely destination points. In step 33 the map display, as shown in FIG. 5, has been adapted accordingly, so that only a map section is shown, which allows just enough room for orientation on the map display.

It is provided, moreover, that the destination point evaluated as the most likely destination point is highlighted, as shown in FIG. 5 by way of example using the destination point "Berlin" by means of a frame.

If a selection of an indicated destination is recognized, query 34 is followed by query 35, whether the selection is valid. This type of query 35 is provided particularly when the selection of an indicated or displayed destination occurs acoustically. If it cannot be identified which destination shown in the map display is to be selected, query 35 is followed by a step 37 with a request to repeat the input. This can occur graphically and/or acoustically. However, the selection of the destination in the map display is valid, query 35 is followed by a step 36, in which the selected destination is used as the destination of a route and a corresponding route is calculated.

Figure 6:
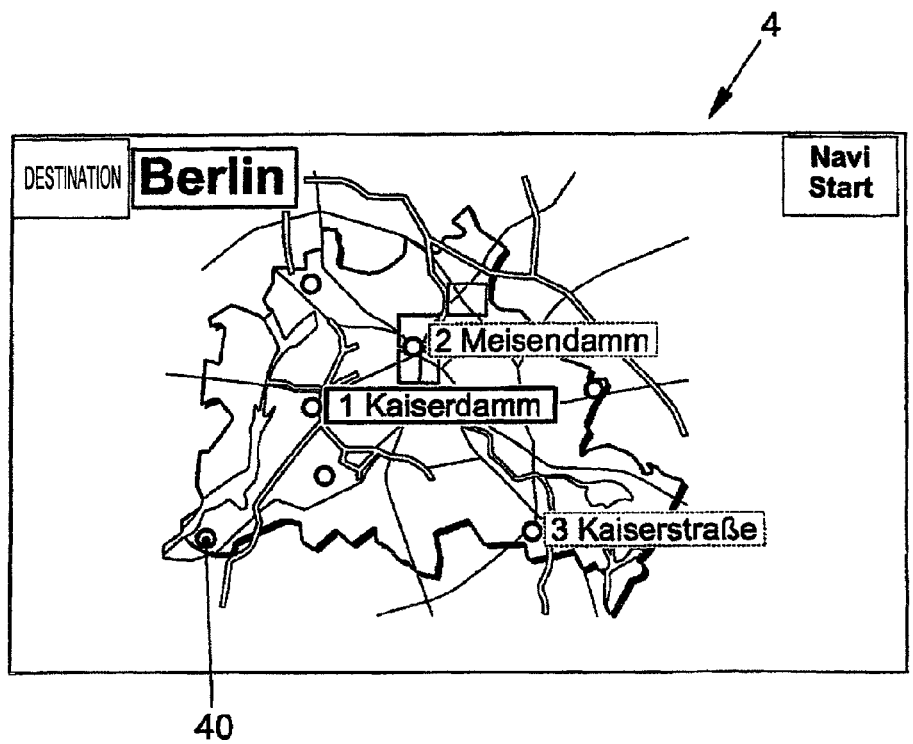
FIG. 6 shows an alternative exemplary embodiment of a display of possible destinations or a selection of possible destinations in a map display.

FIG. 6 shows an alternative exemplary embodiment of a display of possible destinations in a map display. In this case, for example, a number of destinations in the form of streets in the city of Berlin are shown, whereby the likely destination, "Kaiserdamm" in the present exemplary embodiment, is especially highlighted. Other very likely destinations are emphasized by their names, such as, for example, "Meisendamm" and "Kaiserstrasse." Less likely destinations are designated only by markers (e.g., circles), as designated by way of example with reference character 40 in the exemplary embodiment according to FIG. 6.

The display form, shown by way of example in FIG. 6, is considered especially advantageous also in conjunction with acoustic inputs for possible destination points, whereby the map display according to FIG. 6 is shown, for example, as a reaction to the voice input "Berlin Kaiserdamm" or "Kaiserdamm Berlin." The possible destinations shown in the map display according to FIG. 6 can be selected, for example, by means of a touch screen arranged over display 4 or control element 5. If a touch screen arranged over display 4 is provided, for example, a selection can occur by touching the touch screen in the area of the indicated name or the assigned destination.

The possible destination points, which are shown only as markers but not by a name label, can be activated by means of control element 5 and/or by means of the touch screen arranged over display 4. Upon their selection, the associated name is indicated, which disappears again, however, when another marker is activated or selected. Moreover, it can be provided that possible destinations, which are not displayed in the map display, can also be called up by user interaction and thereby displayed. In the case of voice input, this can occur, for example, by direct naming of a visible or not visible alternative.

Figure 7:
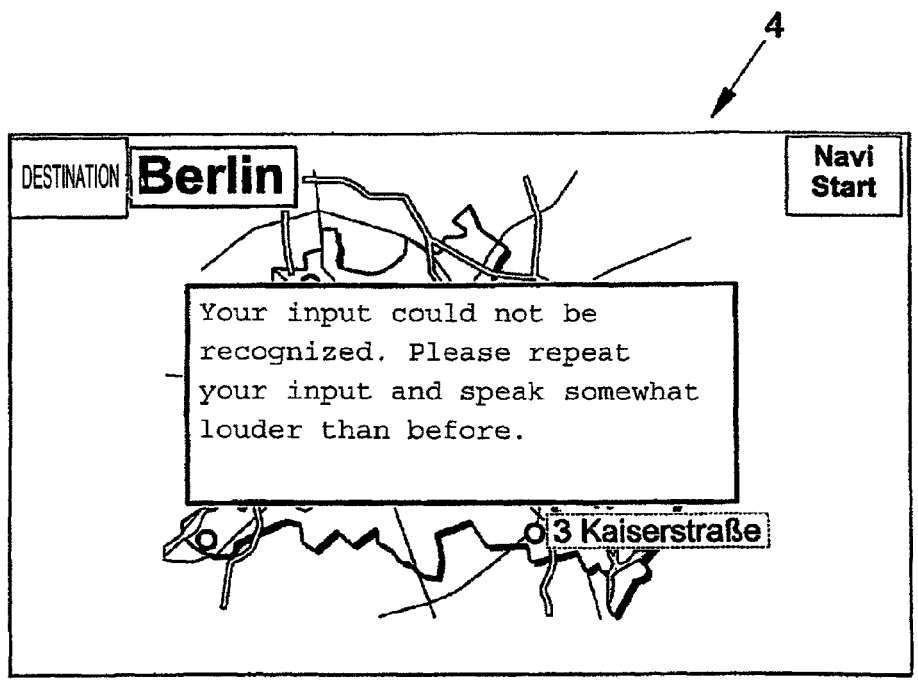
FIG. 7 shows an exemplary embodiment of a request for a repeated selection of an indicated destination.

If, for example, the selection of a destination point is made acoustically, this destination is selected as the destination of a route and a corresponding route is calculated (cf. step 36). If the acoustic selection cannot be clearly identified, as shown by way of example in FIG. 7, a corresponding error message or request for a repeated selection occurs, which represents an exemplary embodiment for step 37. In addition or alternatively, a suitable acoustic input request can occur.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A navigation system for a motor vehicle for determining a route to a destination, the navigation system comprising:
   an input device configured for an alphanumeric input of a destination name;
   a display configured to display changing information; and
   a processing unit configured to determine, as possible destinations, destinations with letters that match the alphanumeric input of less than the complete destination name, and to display a selection of said possible destinations as destination points in a map via the display during the input of the destination, and configured to determine, based on an input of an additional letter of the destination name, changed possible destinations and to display a selection of the changed possible destination points in the map via the display,
   wherein a most likely destination is shown highlighted in the map.

2. The navigation system according to claim 1, wherein the navigation system further comprises a control element configured to select a destination in the map display.

3. A method for operating a navigation system for determining a route to a destination, the method comprising:
   providing a navigation system comprising an input device configured for an alphanumeric input of a destination name, a display configured to display changing information, and a processing unit configured to display possible destinations in a map display;
   displaying as destination points in a map in the map display, during the input of the destination name, a selection of possible destinations, wherein the possible destinations have letters that match the alphanumeric input of less than the complete destination name; and
   based, at least in part, on input of an additional letter of the destination name, displaying, as changed destination points in a map on the display, a selection of the changed possible destinations,
   wherein a most likely destination is shown highlighted in the map.

4. The method according to claim 3, wherein the selection comprises no more than 10 destinations.

5. The method according to claim 3, wherein the selection comprises most likely destinations.

6. The method according to claim 3, wherein a narrower selection of the selection of possible destinations is displayed highlighted in the map display.

7. The method according to claim 6, wherein the narrower selection comprises most likely destinations.

8. The method according to claim 3, wherein a destination of the selection of the destinations shown in the map display is selected acoustically.

9. The method according to claim 3, wherein during and/or after the inputting of the destination, via the display, possible destinations are displayed in the map display and a shown destination is selected acoustically.

10. The method according to claim 9, wherein a request for a repeated selection is output when the acoustic input could not be assigned to a destination.

11. A navigation system, comprising:
an input device configured for an alphanumeric input of a destination name;
a display configured to display changing information; and
a processing unit configured to display a selection of possible destinations as destination points in a map via the display during the alphanumeric input of the destination name, the selection of possible destinations being based on the input of the destination name and comprising possible destinations with letters that match the alphanumeric input of less than the complete destination name, and configured to change the selection of possible destinations and the corresponding display of the changed selection of destination points in a map via the display, based on input of an additional letter of the destination name,
wherein the processing unit is configured to determine which of the possible destinations is most likely the destination name based on a starting point, a location of the navigation system, or a size of the possible destinations and the processing unit is configured to highlight a most likely destination in the map display.

12. The navigation system according to claim 1, wherein the selection of changed possible destinations displayed is updated as each additional letter is input.

13. The method according to claim 3, wherein the most likely destination is determined based on a nearness of a starting point, a location of the navigation system, or a size of the destination.

14. The method according to claim 3, wherein the mostly likely destination is highlighted by color, increased size, or animation.

* * * * *